US012285771B2

(12) United States Patent
Muraoka

(10) Patent No.: US 12,285,771 B2
(45) Date of Patent: *Apr. 29, 2025

(54) SHOWERHEAD WITH PIN PLATE

(71) Applicant: Kohler Co., Kohler, WI (US)

(72) Inventor: Hiroyuki Chanseol Muraoka, New York, NY (US)

(73) Assignee: KOHLER CO., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,252

(22) Filed: Sep. 1, 2023

(65) Prior Publication Data

US 2023/0405614 A1 Dec. 21, 2023

Related U.S. Application Data

(63) Continuation of application No. 17/538,673, filed on Nov. 30, 2021, now Pat. No. 11,745,193, which is a (Continued)

(51) Int. Cl.

*B05B 1/18* (2006.01)
*B05B 1/02* (2006.01)

(Continued)

(52) U.S. Cl.

CPC ................ *B05B 1/185* (2013.01); *B05B 1/02* (2013.01); *B05B 1/12* (2013.01); *B05B 1/16* (2013.01); *B05B 1/3053* (2013.01); *E03C 1/066* (2013.01)

(58) Field of Classification Search

CPC ........... B05B 1/02; B05B 1/083; B05B 1/086; B05B 1/12; B05B 1/16; B05B 1/18;

(Continued)

(56) References Cited

U.S. PATENT DOCUMENTS 1,982,538 A * 11/1934 Reedy ................. B05B 15/5225 239/117
3,373,942 A 3/1968 Roman et al.

(Continued)

FOREIGN PATENT DOCUMENTS

| | | | | |
|---|---|---|---|---|
| DE | 43 26 796 | 2/1995 | | |
| EP | 3578268 A1 * | 12/2019 | .............. | B05B 1/12 |
| WO | WO-2017059793 A1 * | 4/2017 | | |

OTHER PUBLICATIONS

Non-Final Office Action on U.S. Appl. No. 17/538,673 DTD Dec. 21, 2022.

(Continued)

*Primary Examiner* — Darren W Gorman

(74) *Attorney, Agent, or Firm* — FOLEY & LARDNER LLP

(57) ABSTRACT

A spray head includes a front cover, a spray plate, and an actuator. The front cover includes a plurality of exit openings. The spray plate is oriented substantially parallel to the front cover. The spray plate includes a pin that is aligned with at least one exit opening of the plurality of exit openings. The pin is configured to selectively engage with the at least one exit opening to control a flow of water through the at least one exit opening. The actuator is coupled to the spray plate and is configured to reposition the spray plate relative to the front cover based on user input.

20 Claims, 13 Drawing Sheets

Related U.S. Application Data continuation of application No. 16/565,923, filed on Sep. 10, 2019, now Pat. No. 11,192,125.

(60) Provisional application No. 62/729,464, filed on Sep. 11, 2018.

(51) Int. Cl.

| | |
|---|---|
| ***B05B 1/12*** | (2006.01) |
| ***B05B 1/16*** | (2006.01) |
| ***B05B 1/30*** | (2006.01) |
| *E03C 1/06* | (2006.01) |

(58) Field of Classification Search

CPC ..... B05B 1/185; B05B 1/3046; B05B 1/3053; B05B 15/522; B05B 15/5223; B05B 15/5225; E03C 1/066

See application file for complete search history.

(56) References Cited

U.S. PATENT DOCUMENTS

| | | | | |
|---|---|---|---|---|
| 3,820,716 | A | | 6/1974 | Bauer |
| 4,426,040 | A | | 1/1984 | Smith |
| 5,143,300 | A | | 9/1992 | Cutler |
| 5,228,625 | A | * | 7/1993 | Grassberger .......... B05B 15/528 239/602 |
| 5,718,380 | A | | 2/1998 | Schorn et al. |
| 6,092,739 | A | | 7/2000 | Clearman et al. |
| 6,158,675 | A | | 12/2000 | Ogi |
| 6,349,428 | B1 | | 2/2002 | Nasr et al. |
| 6,715,699 | B1 | | 4/2004 | Greenberg et al. |
| 7,278,591 | B2 | | 10/2007 | Clearman et al. |
| 8,511,587 | B2 | | 8/2013 | Miller et al. |
| 9,056,325 | B2 | | 6/2015 | Torontow |
| 2003/0062426 | A1 | | 4/2003 | Gregory et al. |
| 2011/0108640 | A1 | | 5/2011 | Grohe et al. |
| 2012/0325353 | A1 | | 12/2012 | Zhou et al. |
| 2016/0325292 | A1 | | 11/2016 | Hawkins |
| 2019/0176169 | A1 | | 6/2019 | Zhuo et al. |

OTHER PUBLICATIONS

Notice of Allowance on U.S. Appl. No. 17/538,673 DTD Apr. 18, 2023.

U.S. Pre-Interview First Office Action Communication for U.S. Appl. No. 16/565,923 DTD May 10, 2021 (5 pages).

U.S. Notice of Allowance on U.S. Appl. No. 16/565,923 DTD Aug. 3, 2021.

U.S. Office Action on U.S. Appl. No. 16/565,923 DTD May 10, 2021.

* cited by examiner

SHOWERHEAD WITH PIN PLATE

CROSS-REFERENCE TO RELATED PATENT APPLICATIONS

This application is a continuation of U.S. patent application Ser. No. 17/538,673, filed Nov. 30, 2021, which is a continuation of U.S. patent application Ser. No. 16/565,923, filed Sep. 10, 2019 (now U.S. Pat. No. 11,192,125), which claims the benefit of and priority to U.S. Provisional Application No. 62/729,464, filed Sep. 11, 2018, all of which are hereby incorporated by reference in their entireties.

BACKGROUND

The present application relates generally to the field of showerheads. More specifically, this application relates to hand held showerheads with multiple spray modes.

SUMMARY

One exemplary embodiment of the present disclosure relates to a spray head. The spray head includes a front cover, a spray plate, and an actuator. The front cover includes a plurality of exit openings. The spray plate is oriented substantially parallel to the front cover. The spray plate includes a pin that is aligned with at least one exit opening of the plurality of exit openings. The pin is configured to selectively engage with the at least one exit opening to control a flow of water through the at least one exit opening. The actuator is coupled to the spray plate and is configured to reposition the spray plate relative to the front cover based on user input.

In some embodiments, the spray head further includes a flexible gasket disposed between the front cover and the spray plate. The flexible gasket may include a protrusion that is aligned with both the pin and the at least one exit opening. The pin is configured to selectively engage with the at least one exit opening by pressing the protrusion at least partially into the at least one exit opening.

In some embodiments, the spray head further includes a back cover sealingly coupled to the front cover. The back cover may be spaced apart from the front cover across at least a portion of the back cover to form a cavity. The spray plate may be disposed within the cavity.

Another exemplary embodiment of the present disclosure relates to a hand held showerhead. The hand held showerhead includes a handle, a front cover, a spray plate, and an actuator. The handle is configured to receive water from a water supply. The front cover is disposed on a first end of the handle and includes a plurality of exit openings. The spray plate is oriented substantially parallel to the front cover. The spray plate includes a pin that is aligned with at least one exit opening of the plurality of exit openings. The pin is configured to selectively engage with the at least one exit opening to control a flow of water through the at least one exit opening. The actuator is coupled to the spray plate and is configured to reposition the spray plate relative to the front cover based on user input.

DETAILED DESCRIPTION

Figure 1:
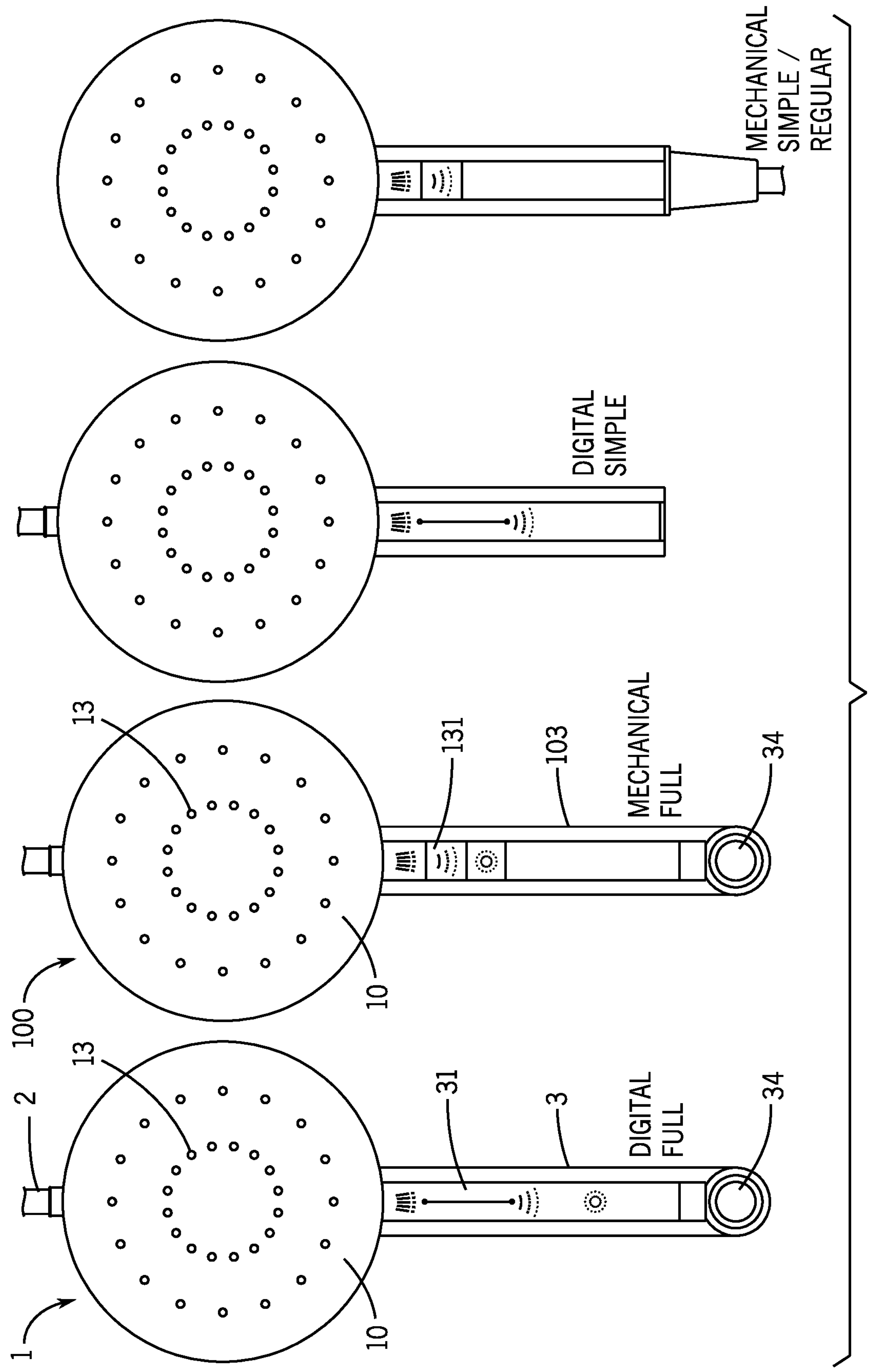
FIG. 1 is a perspective view of multiple hand showers, according to various exemplary embodiments.

The present disclosure relates to handheld showerheads having an internal spray plate and that is configured such that the spray mode may be electromagnetically controlled. At least one embodiment of the present disclosure relates to a handheld showerhead, or hand shower, designed to allow a user to interact with a user interface to select a desired spray mode. For example, a user may desire a soft spray or a hard spray, or any level therebetween, or may alternatively desire a special mode, such as a pulsing spray mode. The hand shower has a spray plate having a plurality of pins which align and engage with a corresponding plurality of protrusions on a flexible gasket which may selectively mate with exit holes on a front cover of the hand shower as a means of controlling the water flow out of the hand shower. The engagement of the protrusions and exit holes may be electromechanically controlled such that, depending upon the spray mode, the protrusions may obstruct the exit holes to change the spray pattern.

At least one embodiment of the present disclosure relates to an overhead showerhead that is configured similarly to the hand showers of the present disclosure. Specifically, the overhead showerhead may have the same components as the hand showers described in detail in this disclosure, and may be configured such that a user may select a spray mode and the overhead showerhead may be electromagnetically controlled to discharge the desired spray mode for the user.

At least one embodiment of the present disclosure relates to a hand shower which includes a front cover having exit holes through which a primary spray is discharged, and a secondary spray head disposed at a lower end of the hand shower. The secondary spray head may be configured to operate and provide substantially similar features for the secondary spray as for the primary spray.

At least one embodiment of the present disclosure relates to a retractable shower hose system configured to enable the shower hose to automatically retract into a shower column or into the wall.

At least one embodiment of the present disclosure relates to a receiver configured to allow a hand shower to be maintained at adjustable heights. A shower column may include a track that couples to a receiver for a hand shower, and which may additionally include a button for a user to interface with to lock or unlock the receiver and change the desired height at which the hand shower is maintained.

Hand showers, or handheld showerheads, are a common alternative or supplement to showering with an overhead or fixed showerhead. Showerheads sometimes enable a user to select a spray mode, which may be configured to change the pressure or shape of the water spray exiting the showerhead. In addition, while some users desire a massaging or pulsing spray mode, generally a separate unit which is specifically configured for such a mode would be needed. Accordingly, this application presents a hand shower which is configured to easily allow a user to select and experience various spray modes or features.

Referring generally to the Figures, disclosed herein is a handheld showerhead, or hand shower. A user may hold the hand shower, or may removably couple the hand shower to a receiver affixed to a wall or shower column. The hand shower is designed to allow a user to interact with a user interface to select a desired spray mode. For example, a user may desire a soft spray or a hard spray, or any level therebetween, or may alternately desire a special mode, such as a pulsing spray mode. The hand shower has an internal spray plate having a series of pins which mate with exit holes on a front cover of the hand shower. The position of the spray plate may be controlled using an actuator based on user input (e.g., input from the user interface, etc.). For example, the hand shower may be electromechanically controlled such that, depending upon the spray mode, the pins may cause protrusions to obstruct the exit holes of the hand shower to change the spray pattern.

Referring now to FIG. 1, multiple variations of a hand shower are shown, according to various exemplary embodiments. Each of the hand showers is shown to include a shower hose 2, a handle 3, 4, and a front cover 10. The front cover 10 forms part of a primary spray head (e.g., a first spray head) of the hand shower that is disposed at an upper end of the handle 3. Water flowing through the hand shower is dispensed through the spray head. As shown for a first embodiment of the hand shower, shown as mechanical embodiment 1 at the leftmost side of FIG. 1, the shower hose 2 attaches to an upper end of the mechanical hand shower 1 and fluidly couples the mechanical hand shower 1 to a water supply source (not shown). The front cover 10 has a plurality of exit holes 13 through which water is discharged from the mechanical hand shower 1. The handle 3 has a user interface 31 which is configured to receive a user selection for a spray mode. The hand showers of FIG. 1 are shown to have multiple different configurations and features for the user interface. For example, as shown for the mechanical hand shower 1 at the leftmost side of FIG. 1, the user interface 31 may have mechanical buttons for a user to press to select a mode. Alternatively, as shown for a second embodiment of the hand shower, shown as digital hand shower 100 just to the right of mechanical hand shower 1, the user interface 131 may include a digital user interface. In addition, as shown for each of the hand showers 1, 100 on the left side of FIG. 1, the hand shower 1, 100 may include a secondary spray head 34 (e.g., a second spray head, etc.) at a lower end of the hand shower 1, 100, which may also be configured such that a user may select a specific spray mode to be discharged from the secondary spray head 34. For simplicity, and as a result of the various components that are used in each of the hand showers 1, 100 shown in FIG. 1, similar numbering will be used to identify similar components.

Figure 2B:
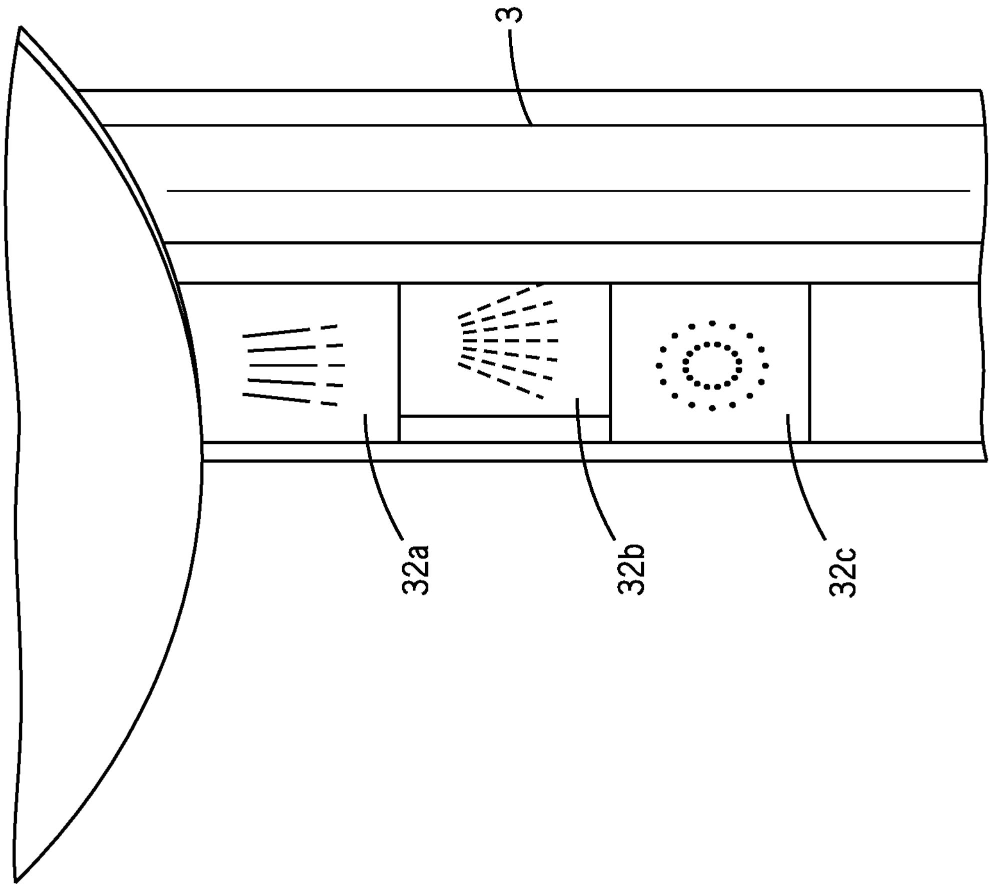
FIG. 2B is a perspective view of the hand shower of FIG. 2A.
Figure 2A:
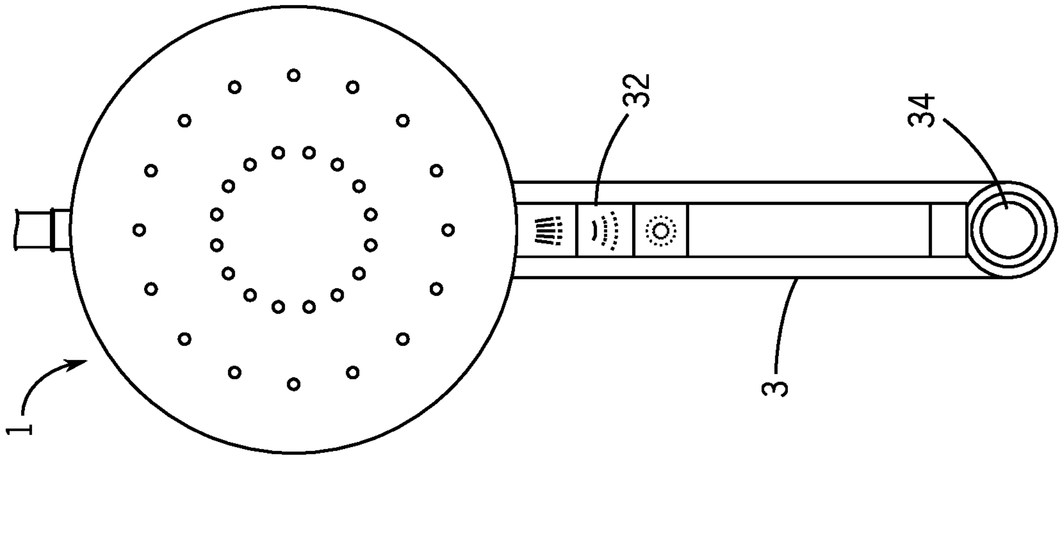
FIG. 2A is a front view of a hand shower that includes a mechanical user interface, according to an exemplary embodiment.

Referring now to FIGS. 2A-2B, a front view of the mechanical hand shower 1 is shown. The mechanical hand shower 1 is configured identically as described above with respect to FIG. 1, and is configured such that the handle 3 has mechanical buttons 32 as a user interface. The mechanical hand shower 1 is also shown to include a secondary spray head 34 at a lower end of the mechanical hand shower 1, opposite the primary spray head. The secondary spray head 34 may be in fluid communication with the water supply (not shown) through the shower hose 2. It should be appreciated that the spray discharged through the exit holes 13 of the front cover 10 of the mechanical hand shower 1 may be referred to as the "primary spray", while the spray discharged through the secondary spray head 34 may be referred to as the "secondary spray." The secondary spray head 34 may include substantially similar components and functionality, and operate in a substantially similar manner as the components of the primary mechanical hand shower 1 (i.e., which produce the primary spray). The mechanical hand shower 1 is shown to include three mechanical buttons 32 with which a user may interface to select a shower mode: a hard spray mode button 32*a*, a soft spray mode button 32*b*, and a special spray mode button 32*c*. The special spray mode button 32*c* may be configured to control the activation or deactivation of the secondary spray head 34. The mechanical hand shower 1 may include a plurality of predetermined spray modes for the secondary spray head 34 which a user may cycle through or select by pressing the special spray mode 32*c* button. Similar to the primary spray mode of the mechanical hand shower 1, the secondary spray head 34 may discharge, for example, a hard spray mode or a soft spray mode option. However, in addition to the hard spray mode or soft spray mode, a user may also select, for example, a massaging spray mode, a silk spray mode, or a laminar spray mode. For example, the massaging spray mode selection may be configured such that the water will pulse when discharged, to provide a massaging feel to the user. The operation of how these spray modes are achieved is described in greater detail below.

Figure 3:
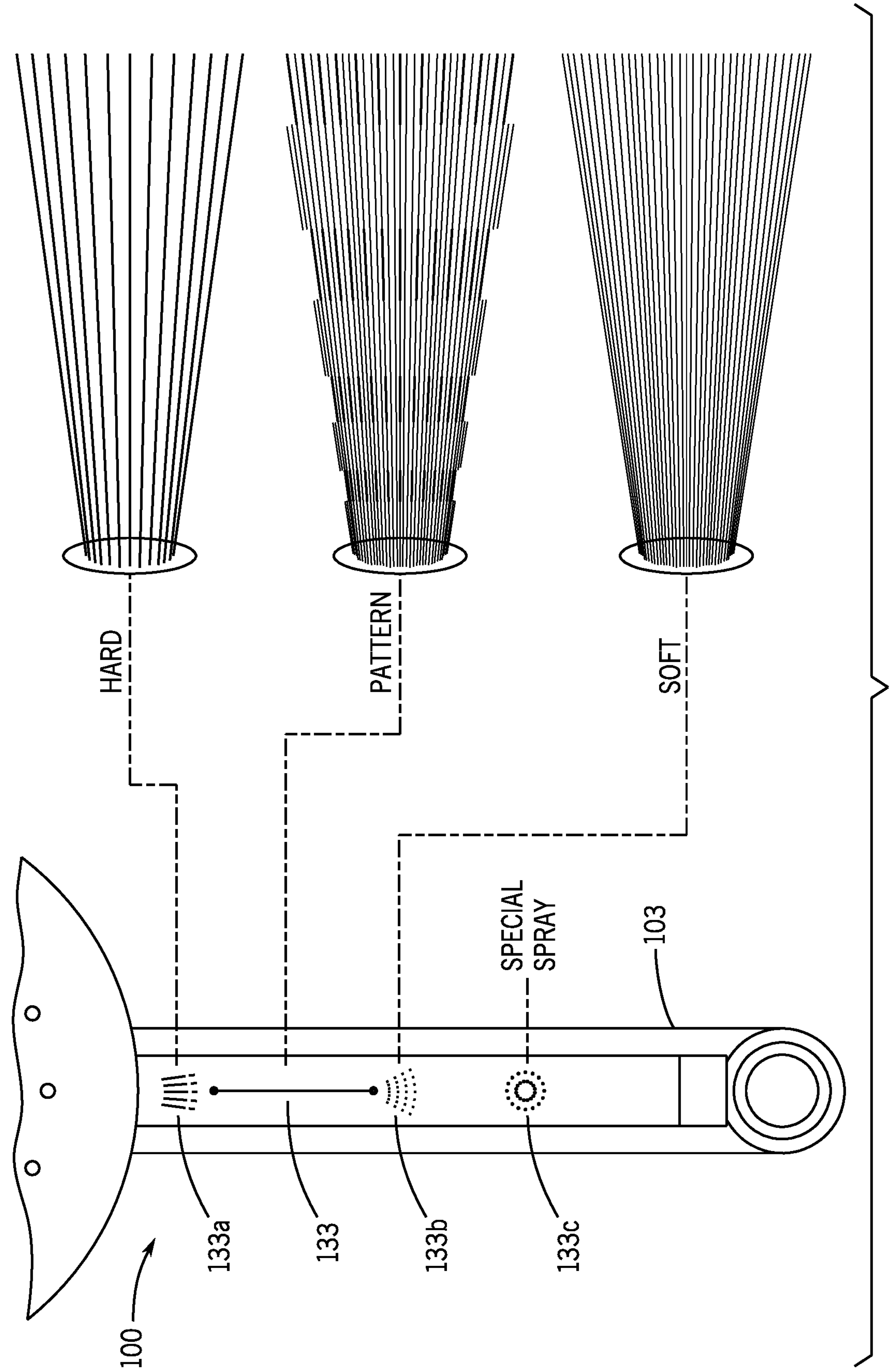
FIG. 3 is a front view of a hand shower that includes a digital user interface, according to an exemplary embodiment.

Referring now to FIG. 3, the digital hand shower 100 is shown. The digital hand shower 100 is configured identically as described above with respect to FIG. 1, and is configured such that the handle 103 includes a digital user interface 133. The digital user interface 133 may be configured to sense a touch of a user. For example, the digital user interface 133 is shown to include a hard spray mode button 133*a*, a soft spray mode button 133*b*, and a scale therebetween. In this way, if a user desires to activate the hard spray mode, they can press the hard spray button 133*a*. However if, for example, the user desires a medium spray mode, they can press an area along the scale between the high spray mode button 133*a* and the soft spray mode button

133*b* of the user interface 133. In this way, the digital user interface 133 may provide an infinite number of spray modes between a hard spray mode and a soft spray mode. In addition, the user may press the digital interface 133 multiple times to select various spray mode features. For example, a user may select the hard spray mode 133*a* button a second time and may change from a constant hard spray mode to a massaging hard spray mode (i.e., where water will pulse when discharged). The digital hand shower 100 is also shown to include a special spray mode button 133*c*. The special spray mode button 133*c* may be configured to control the operation of the secondary spray head 134. For example, a user may press the special spray mode button 133*c* a first time to activate a hard spray mode, a second time to activate a soft spray mode, a third time to activate a massaging spray mode, or a fourth time to cease water flow from the secondary spray head 34. The operation of how these spray modes are achieved is described in greater detail below.

Figure 4:
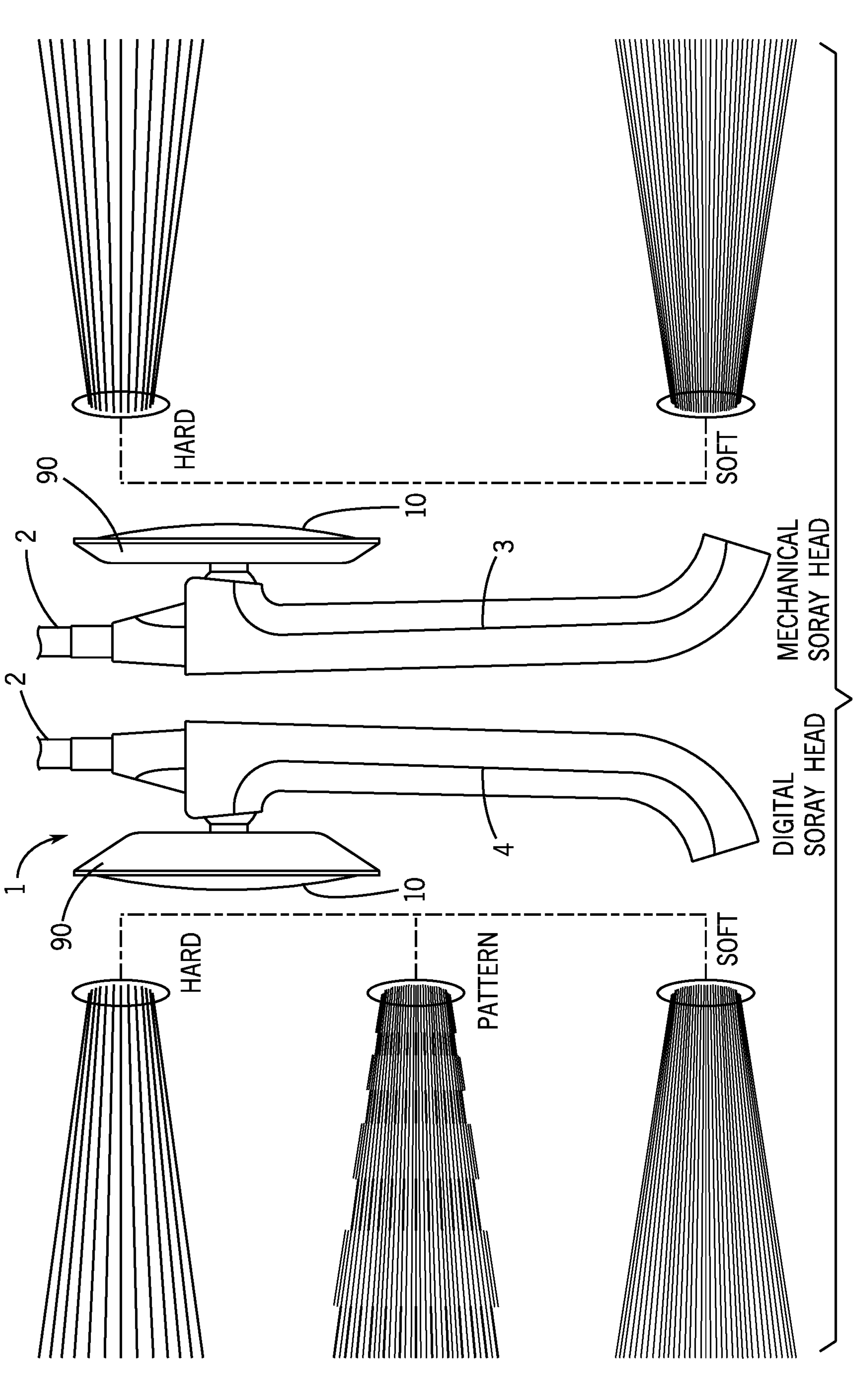
FIG. 4 is a side view of the hand showers from FIGS. 2A and 2B, and additionally shows the spray patterns that may be produced by each hand shower, according to an exemplary embodiment.

Referring now to FIG. 4, a side view of the both the mechanical hand shower 1 and the digital hand shower 100 is shown. Each of the hand showers 1, 100 includes a shower hose 2 attached at an upper end and a handle 3, 4 extending downward. Each hand shower 1 (e.g., a primary spray head for each hand shower), 100 includes a back cover 90 which mates to a front cover 10 extending from a front surface of the hand shower 1, 100. The back cover 90 and front cover 10 sealingly create (e.g., define, form, etc.) a cavity which houses components that may control the flow of water through the hand shower 1, 100. Water may traverse through the shower hose 2 and enter the hand shower 1, 100 through the back cover 90, before discharging the hand shower 1, 100 through the front cover 10 onto the user. In addition, FIG. 4 also shows a schematic of a variety of the spray modes or patterns that may be discharged by each of the hand showers 1, 100.

Figure 5:
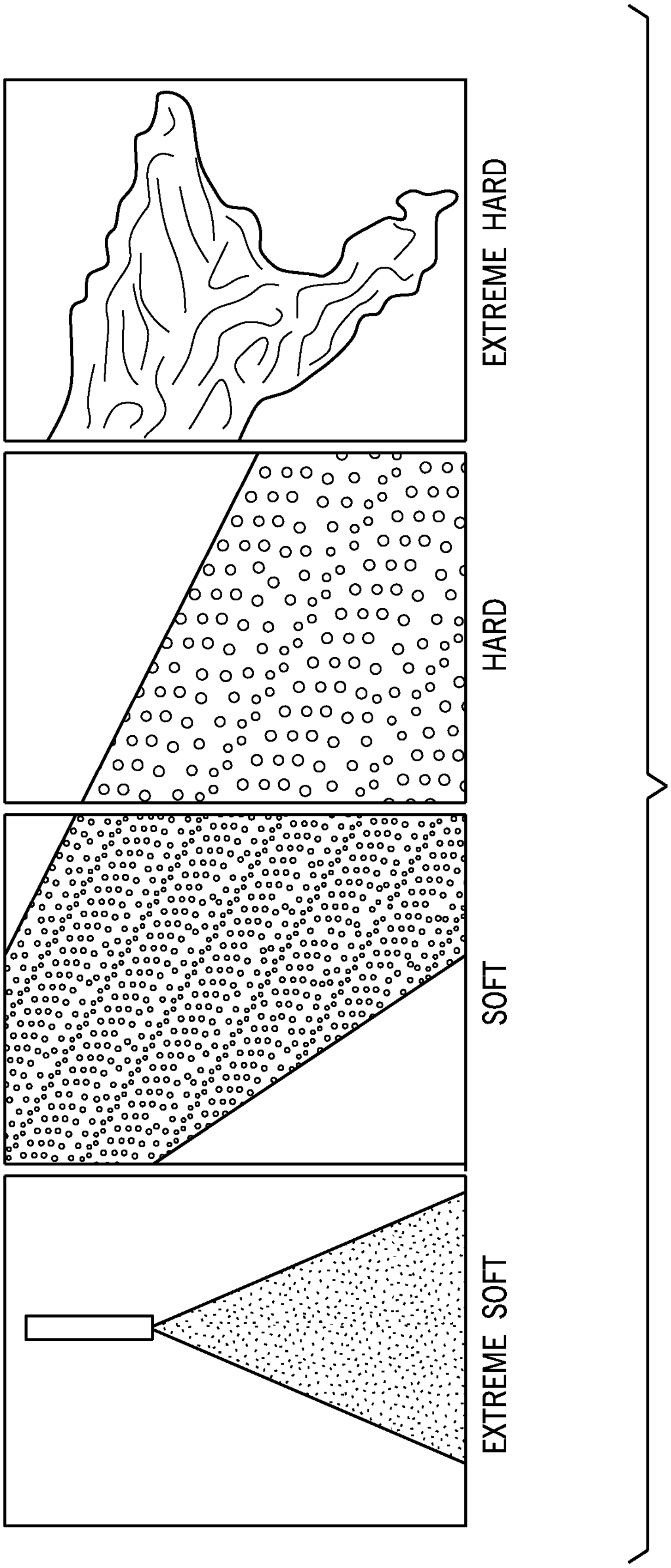
FIG. 5 is a schematic illustration of the spray patterns that may be produced by the hand showers of FIG. 1.

Referring now to FIGS. 4-5, various spray modes of the hand showers 1, 100 are shown. As described above, the handle 3 of the mechanical hand shower 1 of FIG. 2A is equipped with a user interface 31 that is configured to receive a selection by a user which indicates the desired spray mode. While the mechanical buttons 32 may have specific modes available (i.e., hard spray mode 32*a*, soft spray mode 32*b*, and special spray mode 32*c*), the digital user interface 133 of the digital hand sprayer 100 of FIG. 2B may enable a user to select any spray level therebetween as well. As can be seen, an extreme soft or soft spray may be more of a mist to a user, which may be a softer or lighter spray. This may be achieved, as described in greater detail below, by partially obstructing the flow of water out of the digital hand shower 100. A hard or extreme hard spray mode may be desirable, which may be achieved by allowing water to exit the hand shower 1, 100 virtually obstructed. In addition, various special spray options (e.g., massaging spray mode) may be achieved by intermittently blocking all exits from the hand shower 1, 100. The special spray mode button also may enable a secondary spray to be discharged from the secondary spray head 34. The secondary spray head 34 may be configured to provide similar spray mode options as the primary spray mode.

Figure 6:
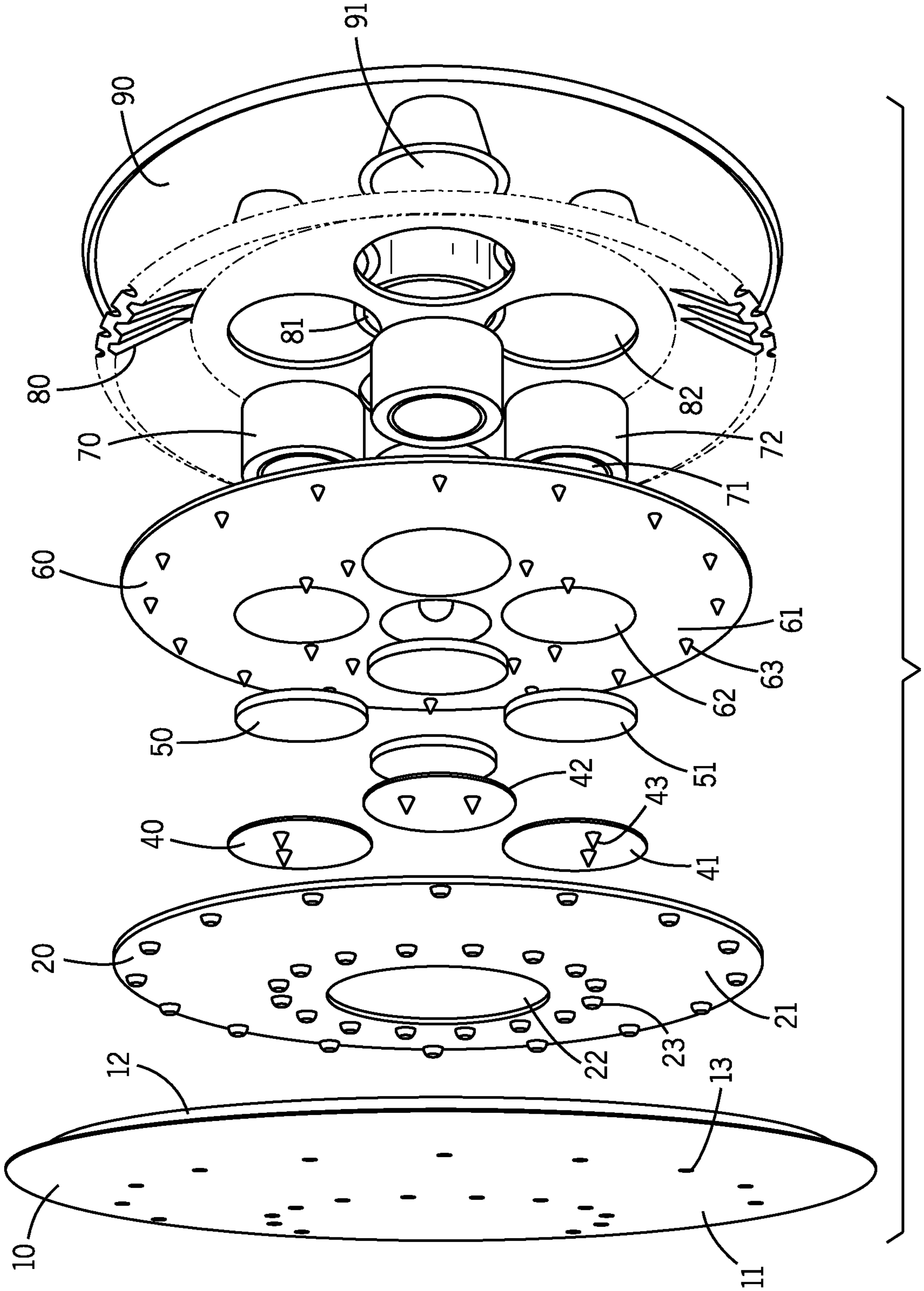
FIG. 6 is an exploded view of a portion of a hand shower, according to an exemplary embodiment.

Referring now to FIG. 6, an exploded view of select components of the hand showers 1, 100 of FIGS. 2A and 3B, respectively, is shown. For simplicity, reference will be made to the hand shower 1 of FIG. 2A. The hand shower 1 is shown to include a front cover 10, a flexible gasket 20, a plurality of magnet covers 40 which may engage with a plurality of magnets 50, a spray plate 60, a plurality of electric magnets 70, a water diffuser 80, and a back cover 90. The front cover 10 and back cover 90 may sealingly couple, and may house the flexible gasket 20, magnet covers 40, magnets 50, spray plate 60, electric magnets 70, and water diffuser 80.

The front cover 10 may have a front surface 11 and a back surface 12, and a plurality of exit holes 13 extending therethrough. As described above, the front cover 10 and back cover 90 may sealingly couple and house the various other components within the hand shower 1. In addition, the exit holes 13 of the front cover 10 may be the water outlet of the hand shower 1. The front cover 10 is shown to have a circular cross section with a generally plate-like shape.

The flexible gasket 20 may be made of, for example, silicon. A front surface 21 of the flexible gasket 20 may be parallel to and intermittently engage with the back surface 12 of the front cover 10. The flexible gasket 20 may be deformable such that if a force is applied to a back surface of the flexible gasket 20, it may elastically deform in the corresponding area. For example, if a force is applied to the back surface of the flexible gasket 20, that area may elastically deform, such that the front surface 21 of the flexible gasket 20 may engage with the back surface 12 of the front cover 10 in the corresponding area. The flexible gasket 20 may generally be spaced apart from the back surface 12 of the front cover 10, unless it is being biased forward by a pressure exerted on a back surface of the flexible gasket 20.

The flexible gasket 20 includes a plurality of protrusions 23 extending from a front surface 21 of the flexible gasket 20. The protrusions 23 may have a generally rounded shape, and each protrusion 23 may correspond with an exit hole 13 on the front cover 10. Specifically, the protrusions 23 may be disposed behind the corresponding exit hole 13 of the front cover 10 and may have the same general shape as the exit hole 13. In addition, the protrusions 23 may be configured such that, when a force is applied to a back surface of the flexible gasket 20 behind the protrusion 23, the protrusion may be forced forward and at least partially received within and sealingly couple to the corresponding exit hole 13. In this way, when water is flowing through the hand shower 1, when a force is applied to the flexible gasket 20 behind a particular protrusion 23, that protrusion 23 may obstruct flow path of the water, such that water is prevented from exiting that particular exit hole 13. When this occurs, the water may be diverted to exit through other exit holes 13, or, in the event that all of the protrusions 23 are blocking all of the exit holes 13, the water may cease from exiting the hand shower 1 until the exit holes 13 are once again unobstructed. The flexible gasket 20 also includes a central opening 22 through which water may flow. In this way, because the flexible gasket 20 is spaced apart from the front cover 10 generally, water may freely flow through the central opening 22 and freely exit the exit holes 13 of the front cover 10.

The hand shower 1 includes a plurality of magnets 50 having a generally circular cross section. The magnets 50 form part of an actuator for the hand shower 1 that is coupled to the spray plate 60 and that is configured to move the spray plate 60 relative to the front cover 10 based on user input. The magnets 50 may extend parallel to the front cover 10 and flexible gasket 20, such that a front surface 51 of the magnets may be parallel to the back surface of the flexible gasket 20. The hand shower 1 is also shown to include a plurality of magnet covers 40. The magnet covers 40 may have the same general shape and perimeter as the magnets 50. The front surface 51 of the magnets 50 may be parallel to and abut a back surface 42 of the magnet covers 40. Alternatively, the front surface 51 of the magnets 50 may be coupled to the back surface 42 of the magnet covers 40, or the magnet covers 40 may be integrally formed with the magnets 50. The magnet covers 40 include a plurality of pins 43 which protrude from a front surface 41 of the covers 40. The pins 43 may have a generally conical shape, and may be oriented such that each pin 43 aligns with a protrusion 23 of the flexible gasket 20. In other words, if a magnet 50 is forced forward (i.e., towards the front cover 10), the magnet cover 40 will correspondingly be forced forward, and will cause the pins 43 to apply a forward force on the back surface of the flexible gasket 20. Because the pins 43 on the magnet covers 40 correspond with the protrusions 23 of the flexible gasket 20, when the pins 43 engage with the flexible gasket 20, the protrusions 23 that correspond with the pins 43 may be forced forward, and may engage with the exit holes 13 of the front cover 10. In this way, the force applied from the magnets 50 may selectively obstruct the flow of water out of the hand shower 1 through corresponding exit holes 13.

The spray plate 60 is oriented substantially parallel to the front cover 10 and the flexible gasket 20, such that a forward surface of the spray plate 60 may, in some operational positions, be approximately coplanar with a rear surface of the flexible gasket 20. The spray plate 60 includes a plurality of openings 62 and a plurality of pins 63 protruding from a front surface 61 of the spray plate 60. The openings 62 may have a circular cross section and receive the magnets 50. In this way, the openings 62 may be positioned such that, when the magnets 50 and magnet covers 40 are received within the openings 62, the pins 43 on the magnet covers 40 may be positioned to align and intermittently engage with the protrusions 23 of the flexible gasket 20. The pins 63 may have a generally conical shape, and each pin 63 may correspond with a protrusion 23 on the flexible gasket 20, and accordingly, also correspond with an exit hole 13 on the front cover 10. Specifically, the pins 63 may be disposed behind corresponding protrusion 23 such that when a force is applied to a back surface of the spray plate 60, the pins 63 may be forced forward to engage with the back surface of the flexible gasket 20 behind the protrusions 23. This may cause the area around the protrusions 23 to elastically deform, such that the protrusions may be at least partially received within and/or sealingly coupled with the corresponding exit holes 13. In this way, when water is flowing through the hand shower 1, when a force is applied to the back surface of the spray plate 60, the spray plate 60 and accordingly, pins 63 may translate forward and abut with the back surface of the flexible gasket Because each pin 63 would engage with the area behind a particular corresponding protrusion 23, that protrusion 23 may obstruct flow path of the water, such that water is prevented from exiting the particular corresponding exit hole 13 unobstructedly. When a protrusion 23 sealingly engages with a particular exit hole 13, the water flow will be prevented from discharging through that hole, but when the protrusion 23 is merely obstructing (i.e., not completely blocking) the flow of water through the exit hole 13, the pressure may cause the water to exit as a mist.

The water diffuser 80 is shown to include a central opening 81, through which water may flow, and a plurality of openings 82 which may receive the electric magnets 70. Specifically, the Openings 82 may concentrically align with corresponding openings 62 of the spray plate 60, such that the magnets 50 and electric magnets 70 may each concentrically align. The electric magnets 70 may have a generally circular cross section and include an inner portion 71 as the magnets 50 and the openings 62, while the outer ring portion 72 may be slightly larger than the opening 62. The electric magnets 70 are configured to activate a magnetic force from a signal from a controller or switch. For example, when a user interacts with the digit user interface 133 of the digital hand shower 100 to select a mode, the interaction may electronically signal to the electric magnets 70 to activate or deactivate the electric magnets 70, so as to control the flow of water out of the digital hand shower 100. In addition, when a user interacts with the mechanical interface 32 of the mechanical hand shower 1, their selection of a button may cause the button to engage with a switch, which may send a signal to the electric magnets 70 to activate or deactivate. The plurality of electric magnets 70 may be configured to all activate or deactivate and exert the same force, or may, alternatively, be configured to operate independently, such that some may be activated while others are not. In this way, rather than the electric magnets 70 causing all of the exit holes 13 which are aligned with, for example, the pins 43 on the magnet covers 40 to be obstructed, only select magnet covers 40 may cause select exit holes 13 to be obstructed. This allows for various zones of the hand shower 1 to exert a specific spray mode. According to an exemplary embodiment, the electric magnets 70 may each have a lifting force of 2 lb., and may be configured to apply the entire lifting force, or only a portion of the lifting force. In operation, the force from the electric magnets 70 may force the spray plate 60 to translate forward. When this occurs, the exit holes 13 that align with the pins 63 of the spray plate 60 may be at least partially obstructed by the corresponding protrusions 23 of the flexible gasket 20.

The back cover 90 may include a central opening 91 through which water may flow. Specifically, the central opening 91 may be the water inlet for the hand shower 1, such that water may flow from a water source, through the central opening 91 of the back cover 90 and into the hand shower 1, before exiting through the exit holes 13 of the front cover 10. The back cover 90 also sealingly couples to the front cover 10 of the hand shower 1, and accordingly, may house the flexible gasket 20, magnet covers 40, magnets 50, spray plate 60, electric magnets 70, and water diffuser 80.

Figure 7:
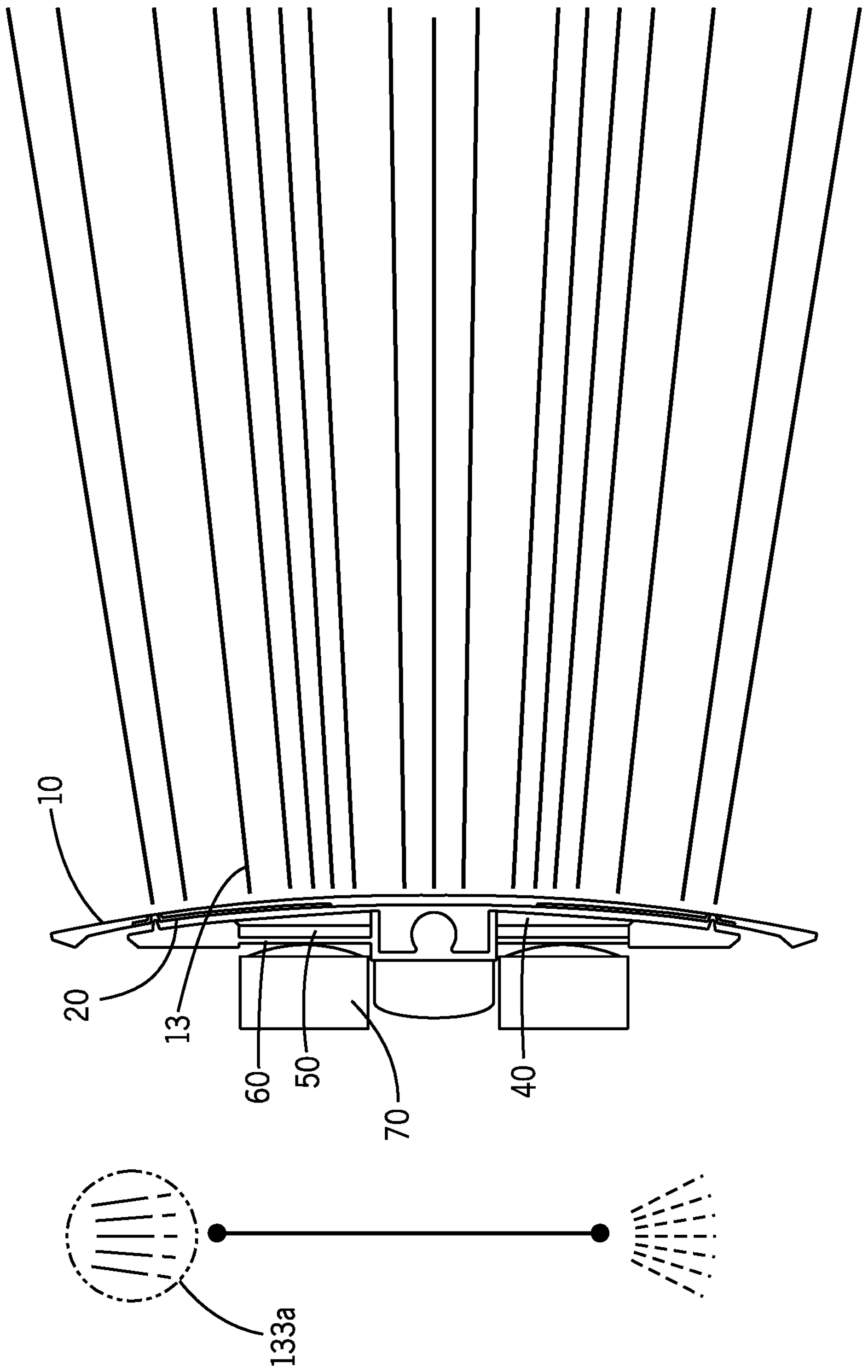
FIG. 7 is a side cross sectional view of the hand shower of FIG. 2B, showing the operation of the hand shower when configured for a hard spray mode, according to an exemplary embodiment.
Figure 8:
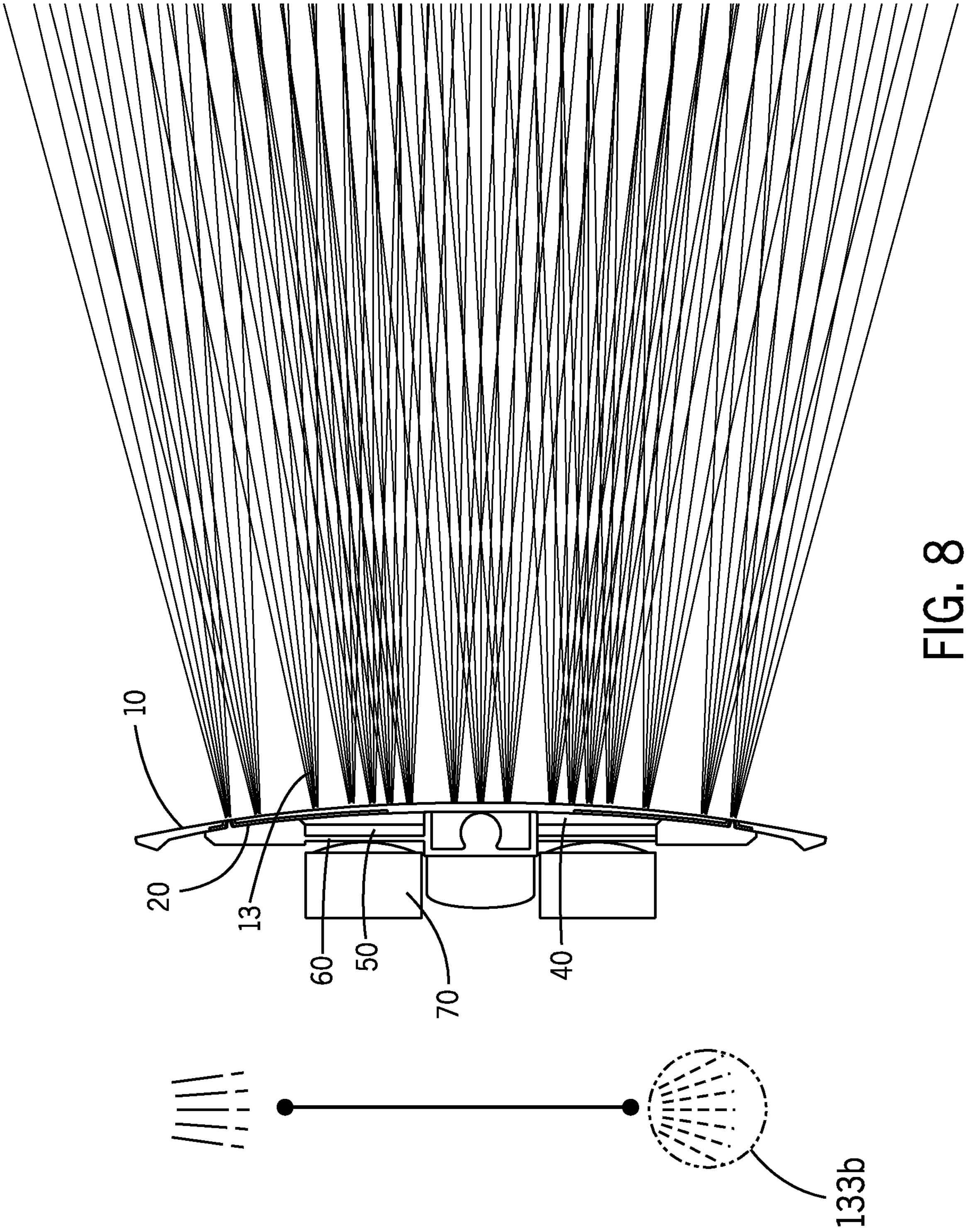
FIG. 8 is a side cross sectional view of the hand shower of FIG. 2B, showing the operation of the hand shower when configured for a soft spray mode, according to an exemplary embodiment.
Figure 9:
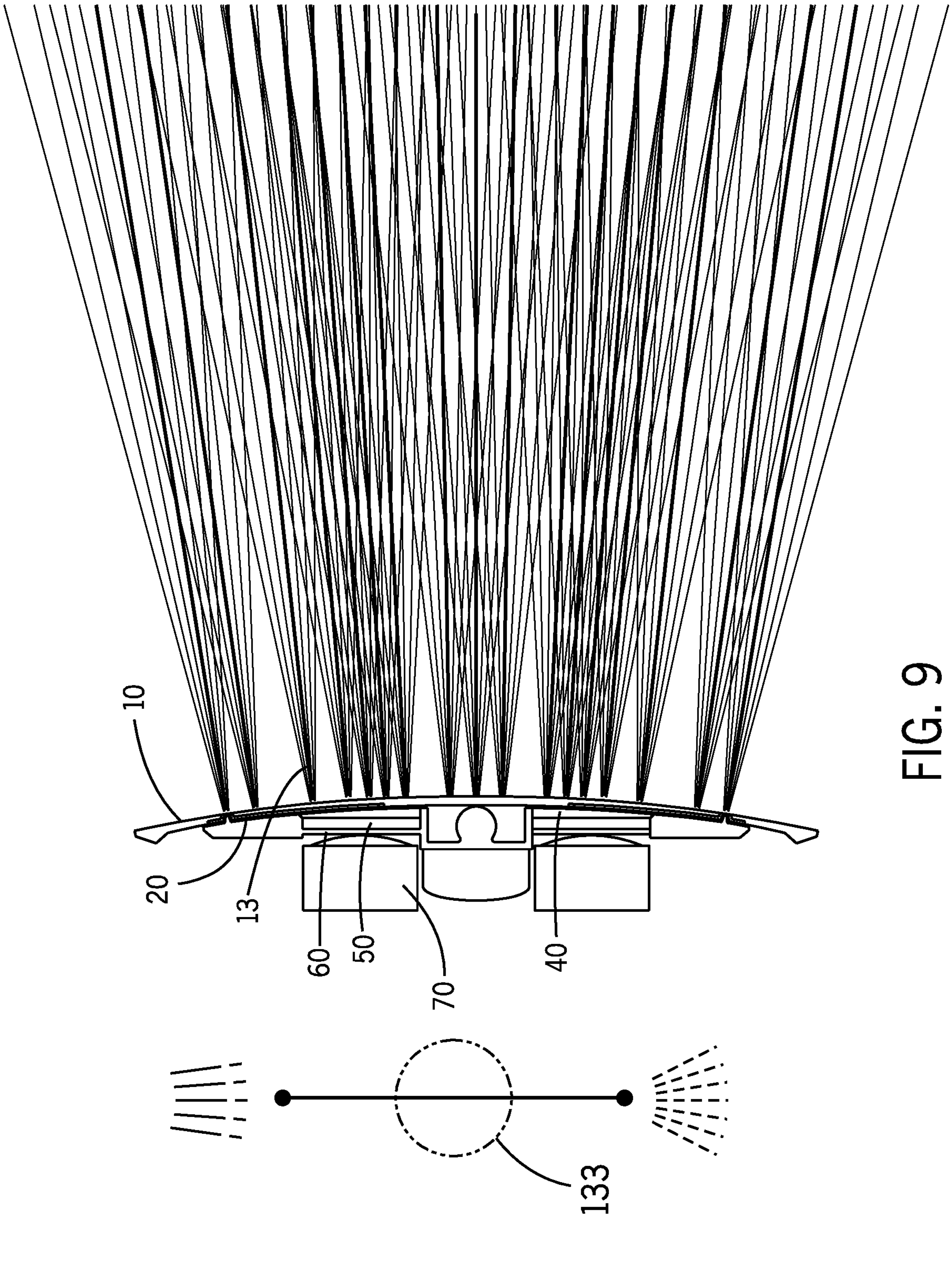
FIG. 9 is a side cross sectional view of the hand shower of FIG. 2B, showing the operation of the hand shower when configured for a medium spray mode, according to an exemplary embodiment.

Referring now to FIGS. 7-9, the operation of the digital hand shower 100 upon receiving a spray mode selection is shown. The figures each show a digital user interface 133 on the left side, with a cross section of select components of the digital hand shower 100, and the resulting spray shown to the right. Referring now to FIG. 7, the hard spray mode *133a* is selected on the digital user interface 133. However, it should be appreciated that the hard spray mode of the digital hand shower 100 would operate in the same manner with a mechanical user interface. During a hard spray mode, water may flow through the exit holes 13 of the front cover 10 with little to no obstruction. In operation, upon a user selecting the hard spray mode button *133a*, a signal indicating the selection may be transferred to the electric magnets 70, indicating the desired operation of the electric magnets 70. In the hard spray mode, the electric magnet 70 may be configured to apply little or no magnetic force to the magnets 50. The magnets 50, accordingly, will not be forcing the magnet covers 40 forward, so neither the pins 43 from the magnet covers 40, nor the pins 63 from the spray plate 60 will be applying a forward force on the flexible gasket 20 to cause it to deform and obstruct the exit holes 13 of the front cover 10. Instead, the water may enter from the central opening 91 of the back cover, flow through the central opening of the water diffuser 80, and discharge through the unobstructed exit holes 13. The unobstructed flow of water through the exit holes 13 may allow the water to maintain a stronger laminar flow, such that it will provide the user with a harder water spray.

Referring now to FIG. 8, the soft spray mode 133*b* is selected on the digital user interface 133. However, it should be appreciated that the soft spray mode of the digital hand shower 100 would operate in the same manner with a mechanical user interface. During a soft spray mode, the protrusions 23 of the flexible gasket 20 may at least partially obstruct the flow of water through the exit holes 13 of the front cover 10. In operation, upon a user selecting the soft spray mode button 133*b*, a signal indicating the selection may be transferring to the electric magnets 70, indicating the desired operation of the electric magnets 70. In the soft spray mode, the electric magnet 70 may be configured to apply a force on the magnets 50 and/or the spray plate 60. The magnets 50, accordingly, may apply a forward force on the magnet covers 40, such that the pins 43 from the magnet covers 40 and/or the pins 63 from the spray plate 60 may apply a forward force on the back surface of the flexible gasket 20. The forward force on the flexible gasket 20 may cause the flexible gasket 20 to elastically deform in the affected areas, causing the protrusions 23 on the front surface 21 of the flexible gasket 20 to be at least partially received within corresponding exit holes 13. By having the protrusions 23 received at least partially within the exit holes 13 of the front cover 10, the water flowing out of the exit holes 13 will be obstructed by the protrusions 23, and will be forced to discharge through a smaller area of the exit holes 13 or through other exit holes 13. The pressure of the water to exit the digital hand shower 100, coupled with the obstruction caused by the protrusions 23 may cause the water to exit the digital hand shower 100 in a softer flow, or as a mist, such that it will provide the user with a softer water spray.

Referring now to FIG. 9, a medium spray mode is selected on the digital user interface 133. During a medium spray mode, the protrusions 23 of the flexible gasket 20 may at least partially obstruct the flow of water through the exit holes 13 of the front cover 10. In operation, upon a user selecting a medium spray mode from the user interface 133, a signal indicating the selection may be transferring to the electric magnets 70, indicating the desired operation of the electric magnets 70. In the medium spray mode, the electric magnet 70 may be configured to apply a force on the magnets 50 and/or the spray plate 60. The magnets 50, accordingly, may apply a forward force on the magnet covers 40, such that the pins 43 from the magnet covers 40 and/or the pins 63 from the spray plate 60 may apply a forward force on the back surface of the flexible gasket 20. The forward force on the flexible gasket 20 may cause the flexible gasket 20 to elastically deform in the affected areas, causing the protrusions 23 on the front surface 21 of the flexible gasket 20 to at least be at least partially received within corresponding exit holes 13. By having the protrusions 23 received at least partially within the exit holes 13 of the front cover 10, the water flowing out of the exit holes 13 will be obstructed by the protrusions 23, and will be forced to discharge through a smaller area of the exit holes 13 or through other exit holes 13. The pressure of the water to exit the digital hand shower 100, coupled with the obstruction caused by the protrusions 23 may cause the water to exit the digital hand shower 100 in a medium flow, or as a partial mist, such that it will provide the user with a medium water spray.

In addition to the spray modes described for FIGS. 7-9, a user may press the user interface 133 multiple times if they desire, for example, a massaging (i.e. pulsing) spray mode. In order to achieve a pulsing spray mode, the spray plate 60 moves toward and away from the front cover 10 periodically (continuously back and forth between the front cover 10 and the water diffuser 80) such that the protrusions 23 intermittently effectively sealingly engage with the exit holes 30. In operation, upon a user selecting the special spray mode 133*c*, a signal indicating the selection may be transferring to the electric magnets 70, indicating the desired operation of the electric magnets 70. When the user selects the massaging spray mode by interacting with the user interface 133 a predetermined amount of times, the electric magnets 70 may activate an intermittent magnetic force, such that the spray plate 60 and magnet 50 may be forced forward intermittently. When this occurs, the pins 43, 63 may engage with a back surface of the flexible gasket 20 behind the corresponding protrusions 23, causing the flexible gasket 20 to elastically deform such that the protrusions 23 may move towards the front cover 10. Specifically, in order to obtain the pulsing spray mode, the protrusions 23 may intermittently sealingly engage with the exit holes 13, such that water may intermittently cease from exiting the digital hand shower 100. Upon the magnetic force intermittently deactivating, the protrusions 23 may rescind, reducing the obstruction, and in effect allowing water to exit through the exit holes 13 again. In addition, it should be appreciated that the secondary spray head 34 may include similar components, and accordingly may operate in a substantially similar manner as described above.

Figure 10:
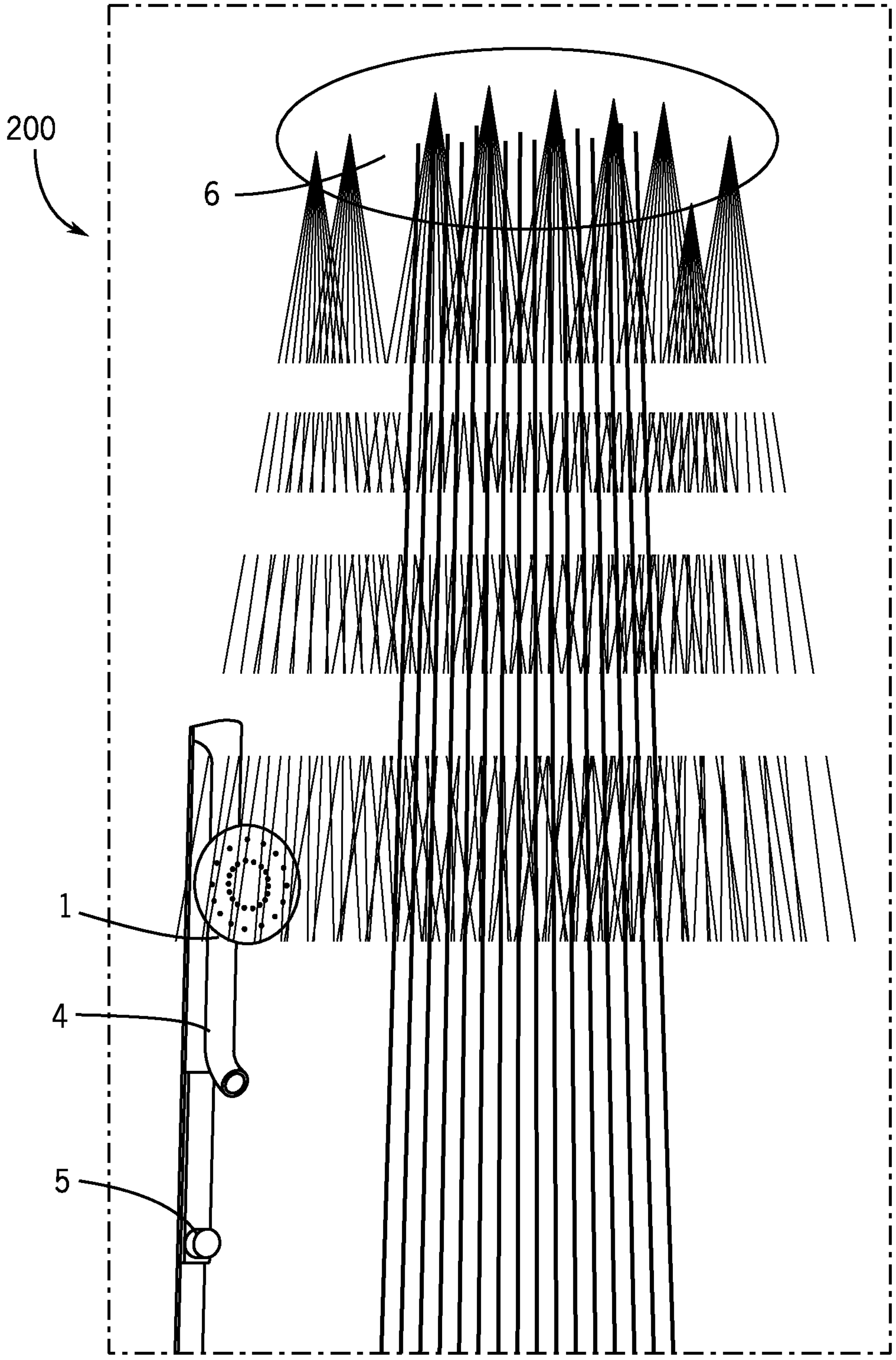
FIG. 10 is a perspective view of shower environment including a hand shower and an overhead showerhead, according to an exemplary embodiment.

Referring now to FIG. 10, a shower environment 200 is shown. Specifically, the shower environment 200 is shown to include a hand shower, which according to an exemplary embodiment, may be the same as or similar to the mechanical hand shower 1 of FIG. 2A. Alternatively, the hand shower may be the same as or similar to the digital hand shower 100 of FIG. 2B. As shown in FIG. 10, the mechanical hand shower 1 is coupled to a shower column 4 having a user interface 5, and an overhead showerhead 6. The mechanical hand shower 1 may be received within a mount or receiver of the shower column 4, such that a user may place the mechanical hand shower 1 in the receiver and have free use of their hands. The overhead showerhead 6 may be, for example, a rain fall shower. The overhead showerhead 6 may be equipped with essentially the same components as the mechanical hand shower 1, such that the overhead showerhead 6 may be configured to operate in the same way as the mechanical hand shower 1 (or alternatively the digital hand shower 100 described above). A user may control the operation of the overhead showerhead 6 on the mechanical hand shower 1, or by interacting with the user interface 5 on the shower column 4. For example, a user may select a spray mode on the user interface 5 of the shower column 4, and the overhead showerhead 6 may be configured to supply the corresponding spray mode in much the same manner as described for the mechanical hand shower 1 (or alternatively as described above for the digital hand shower 100). In addition, in some embodiments, the user may interact with the user interface 5 on the shower column 4 to select a spray mode to be supplied by the mechanical hand shower 1, instead of selecting the mode on the user interface 31 on the handle 3 of the mechanical hand shower 1.

Figure 11:
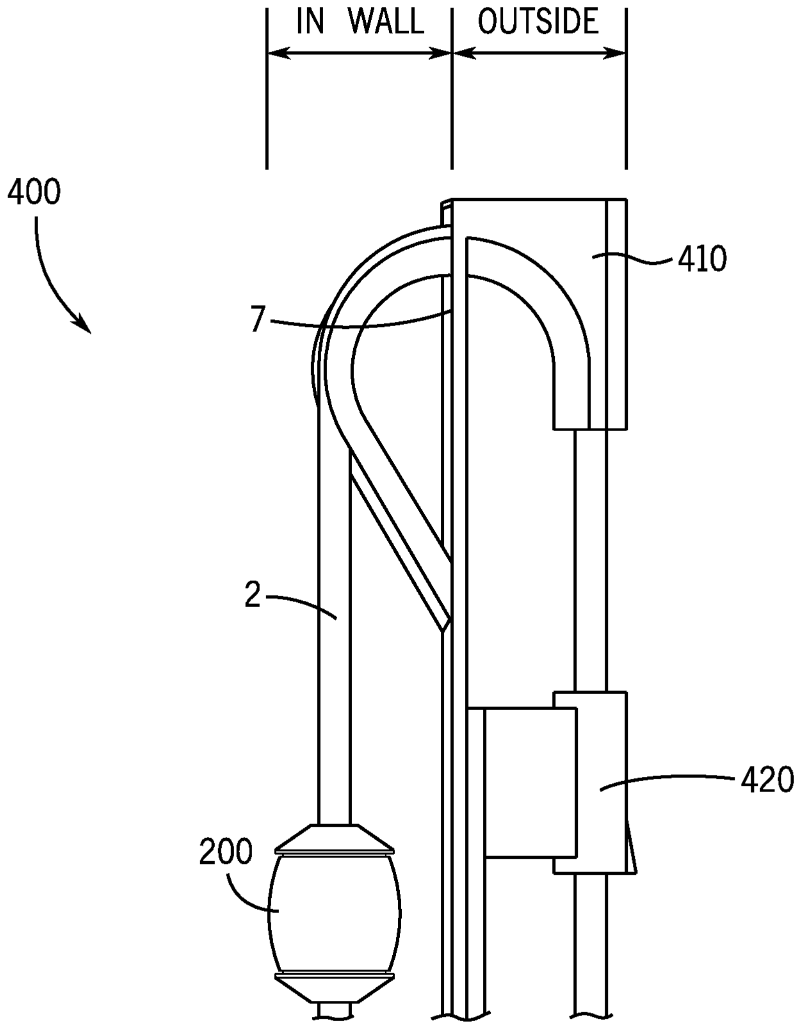
FIG. 11 is a side view of a retractable shower hose system for a hand shower, according to an exemplary embodiment.

Referring now to FIG. 11, an embodiment where a shower hose 2 of a hand shower may be configured to retract into a wall 7 is shown. Specifically, the retractable shower hose system, shown as system 400 may include a shower hose 2 which may extend through a wall 7 and operate as a pulley-like system (i.e., similar to a kitchen sink retractable pulley system). The shower hose 2 may be connected to a hand shower (not shown) at an outer end (i.e., the end disposed in the shower environment 200) and may include a weight 200 at the other end (i.e., the end disposed behind the wall 7). The shower hose 2 may traverse through an upper support 410, and through a hand shower receiver 420 before ending at the hand shower. In this way, the upper support 410 may effectively be a pivot point for a pulley-like system 400 between the weight 200 and the hand shower. The weight 200 may weigh at least as much as the hand shower, such that it may apply a resisting force against the hand shower being pulled further away from the wall 7.

The hand shower receiver 420 may be affixed to the wall or other bracket, or may be coupled to a slidable track, as described in greater detail below. The receiver 420 may removably receive and support the hand shower, to allow the user to have full user of their hands, rather than holding onto the hand shower. When a user removes the hand shower from the receiver 420 and pulls it away from the wall 7, the shower hose 2 will slide through the upper support 410, causing the weight 20 to be pulled upward 200. Upon the user replacing the hand shower into the receiver 420 or moving closer to the wall 7, the weight 200 may be allowed to vertically drop downward as the shower hose 2 returns into the wall. In this way, the weight 200 may assist the force necessary to replace the hand shower.

Figure 12:
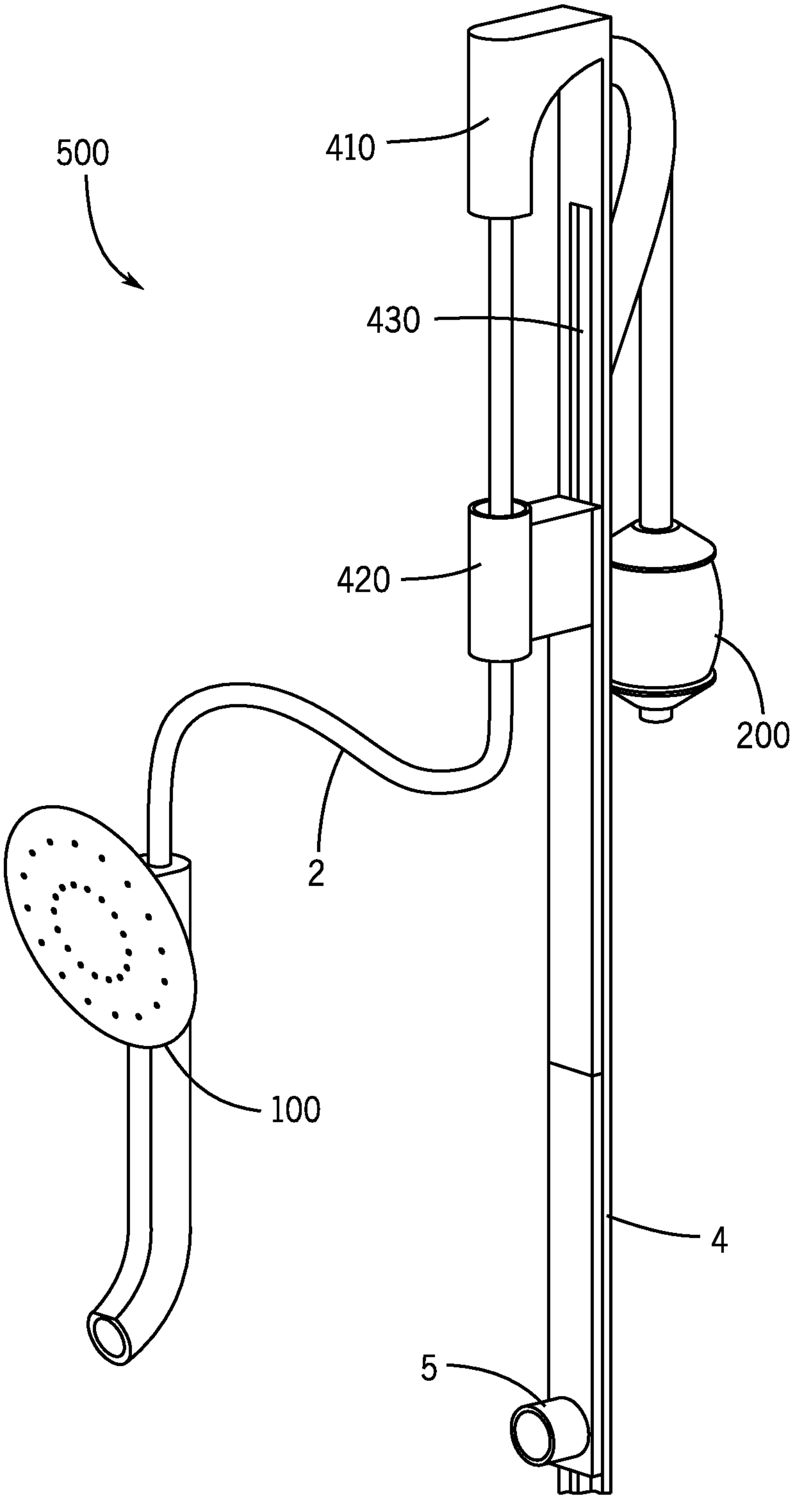
FIG. 12 is a perspective view of a retractable shower hose system for a hand shower, according to another exemplary embodiment.

Referring now to FIG. 12, another embodiment of a retractable shower hose system is shown as system 500. The system 500 includes a shower column 4 instead of a wall 7. As shown, the system may include a digital hand shower (e.g., the digital hand shower 100 of FIG. 2B) attached at an outward end of the shower hose 2 (or alternatively the mechanical hand shower 1 of FIG. 2A), which may traverse through a receiver 420, pivot about an upper support 410, and be counter-weighted by a weight 200 on an opposite end of the hose 200. The upper support 410 may be attached at an upper end of the shower column 4. The shower column 4 may include a user interface 5 and a track 430. The track 430 may be disposed within an upper portion of the shower column 4 and may couple with the receiver 420. Specifically, the receiver 420 may be slidably received within the track 430, such that it may vertically translate within the track 420. Because the receiver 420 is configured to receive the hand shower, the hand shower may accordingly vertically translate within the track 420. In this way, the height at which the hand shower is maintained may be adjustable. Other than the components described, the operation of the retractable shower hose system 500 is significantly similar as described for FIG. 11.

Figure 13:
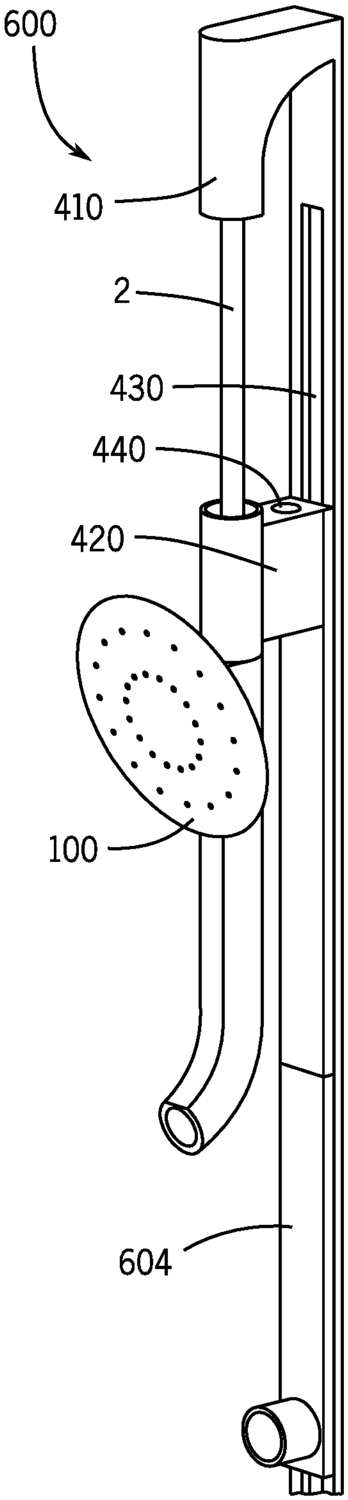
FIG. 13 is a perspective view of a shower column configured to position a hand shower at different heights, according to an exemplary embodiment.

Referring now to FIG. 13, a retractable shower hose system 600 includes a shower column 604 having a mechanical configuration for adjusting the height at which the hand shower (e.g., the digital hand shower 100 of FIG. 2B, or, alternatively, the mechanical hand shower 1 of FIG. 2A) is maintained is shown. The system is shown to include a hand shower attached at an outward end of the shower hose 2, which may traverse through a receiver 420, pivot about an upper support 410, and be counter-weighted by a weight 200 (not shown in FIG. 13) on an opposite end of the hose 200. The upper support 410 may be attached at an upper end of the shower column 604. The shower column 604 may include a track 430. The track 430 may be disposed within an upper portion of the shower column 604 and may couple to the receiver 420. Specifically, the receiver 420 may be slidably received within the track 430, such that it may vertically translate within the track 420. In addition, the receiver 420 may include a mechanical button 440 which may allow a user to selectively lock the receiver 420 at a selected position of the track 430. Specifically, the mechanical button 440 may couple to a member which may engage with the track 430, and may prevent the receiver 420 from vertically moving within the track 430. Upon a user pressing the mechanical button 440, the mechanical member may partially disengage with the track 430, so as to allow the receiver 420 to once again vertically slide within the track 430. The button may be configured such that when the user is not applying a force to the mechanical button 440 any longer, the mechanical member may once again engage with the track 430, preventing the receiver 420 from moving. Because the receiver 420 is configured to receive the hand shower, the height at which the hand shower is maintained may be selected and adjusted by use of the mechanical button 440. Other than the components described, the operation of the retractable shower hose system 600 is significantly similar as described for FIG. 11.

Figure 14:
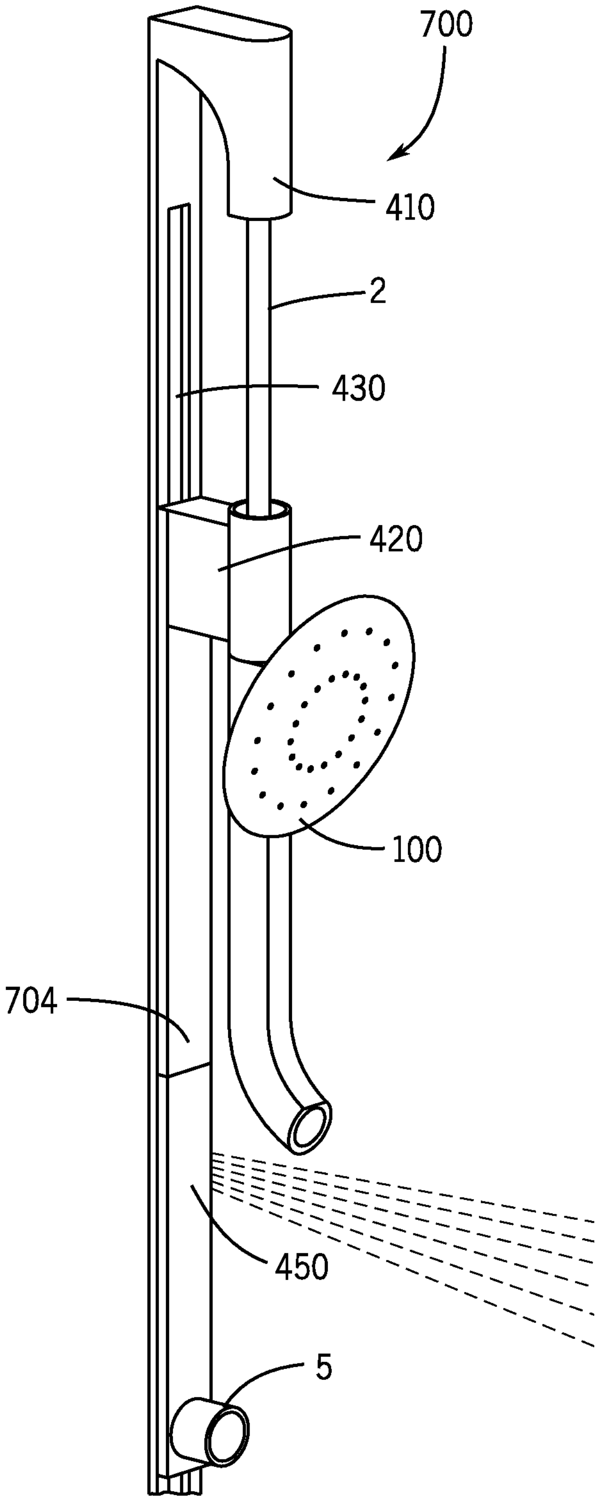
FIG. 14 is a perspective view of a shower column configured to position a hand shower at different heights, according to another exemplary embodiment.

Referring now to FIG. 14, a retractable shower hose system 700 includes a shower column 704 having an automatic configuration for adjusting the height at which the hand shower is maintained is shown. The system 700 is shown to include a hand shower (e.g., the digital hand shower 100 of FIG. 2B, or, alternatively, the mechanical hand shower 1 of FIG. 2A) attached at an outward end of the shower hose 2, which may traverse through a receiver 420, pivot about an upper support 410, and be counter-weighted by a weight 200 (not shown in FIG. 14) on an opposite end of the hose 200. The upper support 410 may be attached at an upper end of the shower column 704. The shower column 704 may include a user interface 5, a track 430, and a user sensing device 450. The user interface 5 may be configured to allow a user to control the spray modes of the hand shower, as well as select the height of the hand shower. In other words, the user interface 5 may be electronically coupled to the hand shower and a controller which controls a mechanical member within the receiver 420 which locks it in place. The user sensing device 450 may be a proximity sensor or other similar sensor. It may be configured to determine the height of a user, and accordingly adjust the height of the hand shower. The track 430 may be disposed within an upper portion of the shower column 704 and may couple with the receiver 420. Specifically, the receiver 420 may be slidably received within the track 430, such that it may vertically translate within the track 420.

Instead of having a mechanical button (i.e., as described with FIG. 13), the shower column 604 may be configured such that the user interface 5 may electronically communicate a signal to allow a user to selectively lock the receiver 420 at a selected position of the track 430. As described above, the receiver 420 may have a similar mechanical member (as described for FIG. 13) which may selectively lock the receiver 420 in place. Upon receiving an input from a user, the user interface 5 may communicate to the receiver 420 to maintain the current height adjustment. To accomplish this, the mechanical member will engage with the track 430, and prevent the track 430 from vertically moving within the track 430. Upon a user indicating they would like to adjust the height of the hand shower, the user interface 5 will communicate with the mechanical member to partially disengage with the track 430, so as to allow the receiver 420 to once again vertically slide within the track 440. The system may be configured such that when the user is not interacting with the user interface 5, the mechanical member will engage with the track 430, preventing the receiver 420 from moving. Because the receiver 420 is configured to receive the hand shower, the height at which the hand shower is maintained may be selected and adjusted by use of the user interface 5. In addition, the user sensing device 450 may detect various parameters of the user and communicate with the receiver 420 to adjust the height of the hand shower accordingly. For example, the user sensing device 450 may detect the top of a user's head, and may communicate to move the hand shower to a height that is, for example, six inches above the height of the user's head. Other than the components described, the operation of the retractable shower hose system may be significantly similar as described for FIG. 11.

In some embodiments, the hand shower (e.g., the digital hand shower 100 of FIG. 2B, or, alternatively, the mechanical hand shower 1 of FIG. 2A) may be configured to mechanically control the spray plate 60 instead of electromagnetically (see also FIG. 6). However, in should be appreciated that the operation of the hand shower and spray modes may be substantially the same.

In some embodiments, power to the hand shower may be provided through the receiver 420, or holder. In this way, rather than having wires connecting a power source to the hand shower, (i.e., such as wires that may be integrally formed with or running parallel to the shower hose 2), the electricity may be transferred from the receiver 420 to the hand shower when the hand shower is docked (i.e., received in the receiver 420). The hand shower may be further configured such that when the hand shower is undocked (i.e., away from the receiver 420), the digital user interface may be disabled, and the hand shower may default to, for example, a hard spray mode. In other words, the receiver 420 may act as a capacitor which may control the power supplied to the hand shower, based on whether or not the hand shower is received within the receiver 420.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the sprayers as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., base, spray head, spray face, control ring, nozzle assembly, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A spray head, comprising:
- a front cover comprising a plurality of openings;
- a spray plate comprising a protrusion, the protrusion engageable with at least one opening of the plurality of openings to control a flow of water through the at least one opening between a plurality of spray modes; and
- a flexible gasket disposed between the front cover and the spray plate, the protrusion configured to engage the flexible gasket in at least one spray mode of the plurality of spray modes to generate a first spray pattern.

2. The spray head of claim 1, wherein a portion of the flexible gasket protrudes into the at least one opening, and the protrusion is configured to deform the flexible gasket in the at least one spray mode.

3. The spray head of claim 1, further comprising a back cover sealingly coupled to the front cover, wherein the back cover is spaced apart from the front cover across at least a portion of the back cover to form a cavity, and wherein the spray plate is disposed within the cavity.

4. The spray head of claim 1, wherein the plurality of spray modes includes a hard spray mode and a soft spray mode.

5. The spray head of claim 4, wherein the spray plate is spaced farther away from the front cover in the hard spray mode as compared to the soft spray mode.

6. The spray head of claim 1, further comprising an actuator coupled to the spray plate and configured to move the spray plate to adjust a spacing between at least a portion of the spray plate and the front cover.

7. A spray head, comprising:

a front cover comprising a plurality of openings;

a spray plate comprising a protrusion, the protrusion engageable with-at least one of the plurality of openings to control a flow of water through the at least one opening between a plurality of spray modes; and an actuator coupled to the spray plate, wherein in at least one operating mode of the spray head the actuator is configured to move the spray plate toward and away from the front cover periodically to intermittently engage and disengage the protrusion with the at least one opening.

8. The spray head of claim 1, wherein the protrusion is one of a plurality of protrusions disposed on the spray plate, and wherein each one of the plurality of protrusions is aligned with a corresponding one of the plurality of openings.

9. The spray head of claim 1, further comprising:

a digital user interface configured to receive a user input; and an actuator communicably coupled to the digital user interface, the actuator configured to move the spray plate relative to the front cover to select any one of the plurality of spray modes based on the user input.

10. The spray head of claim 1, wherein in at least one of the plurality of spray modes the spray plate remains in fixed position with respect to the front cover.

11. A spray head, comprising:

a front cover comprising a plurality of openings;

a spray plate engageable with the front cover to control a spray pattern produced at the plurality of openings between a plurality of spray modes based on a spacing between the spray plate and the front cover, the spray plate comprising a protrusion; and a flexible gasket disposed between the front cover and the spray plate, the protrusion configured to engage the flexible gasket in at least one spray mode of the plurality of spray modes to generate a first spray pattern.

12. The spray head of claim 11, wherein the spray plate is movable relative to the front cover between a first position in which the spray plate engages with the flexible gasket and deforms the flexible gasket to reduce a flow rate through at least one the plurality of openings and a second position in which at least a portion of the spray plate is spaced apart farther apart from the front cover than in the first position.

13. The spray head of claim 11, wherein the spray plate is at a fixed position with respect to the front cover in at least one of the plurality of spray modes.

14. The spray head of claim 11, further comprising an actuator coupled to the spray plate and configured to move the spray plate to adjust the spacing between at least a portion of the spray plate and the front cover.

15. A spray head, comprising:

a front cover comprising a plurality of openings;

a spray plate engageable with the front cover to control a spray pattern produced at the plurality of openings between a plurality of spray modes based on a spacing between the spray plate and the front cover; and an actuator coupled to the spray plate and configured to move the spray plate to adjust the spacing between at least a portion of the spray plate and the front cover, wherein in at least one of the plurality of spray modes the actuator is configured to move the spray plate toward and away from the front cover periodically.

16. The spray head of claim 11, wherein the spray plate is movable relative to the front cover between a soft spray mode and a hard spray mode, further comprising:

a digital user interface configured to receive a user input; and an actuator communicably coupled to the digital user interface, the actuator configured to move the spray plate relative to the front cover to adjust a flow rate through the plurality of openings to any flow rate between the soft spray mode and the hard spray mode based on the user input.

17. A method, comprising:

moving, by an actuator, a spray plate comprising a protrusion to a first position relative to a front cover to produce a first spray pattern, the moving comprising engaging the protrusion with a flexible gasket disposed between the front cover and the spray plate to produce the first spray pattern; and repositioning, by the actuator in response to user input, the spray plate toward the front cover to engage the protrusion with at least one opening of a plurality of openings on the front cover to produce a second spray pattern having a lower flow rate than the first spray pattern.

18. The method of claim 17, wherein repositioning the spray plate includes moving the spray plate to a fixed position with respect to the front cover to produce a fixed spray pattern.

19. The method of claim 17, wherein repositioning the protrusion includes engaging a pin of the spray plate with the at least one opening.

20. The method of claim 17, wherein repositioning the protrusion includes moving the spray plate toward and away from the front cover periodically to intermittently engage and disengage the protrusion of the spray plate with the at least one opening.

* * * * *